(12) United States Patent
Qiu

(10) Patent No.: US 10,693,630 B1
(45) Date of Patent: Jun. 23, 2020

(54) CROSS-BLOCKCHAIN INTERACTION METHOD, APPARATUS, SYSTEM, AND ELECTRONIC DEVICE

(71) Applicant: Alibaba Group Holding Limited, George Town (KY)

(72) Inventor: Honglin Qiu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/814,458

(22) Filed: Mar. 10, 2020

Related U.S. Application Data

(63) Continuation of application No. 16/374,273, filed on Apr. 3, 2019, now Pat. No. 10,615,964.

(30) Foreign Application Priority Data

Apr. 3, 2018 (CN) .......................... 2018 1 0290446

(51) Int. Cl.
| | | |
|---|---|---|
| *H04L 9/06* | (2006.01) | |
| *G06F 9/54* | (2006.01) | |
| *G06F 16/903* | (2019.01) | |
| *G06F 21/64* | (2013.01) | |
| *H04L 9/32* | (2006.01) | |

(52) U.S. Cl.
CPC ............ *H04L 9/0637* (2013.01); *G06F 9/546* (2013.01); *G06F 16/903* (2019.01); *G06F 21/64* (2013.01); *H04L 9/3236* (2013.01); *H04L 2209/38* (2013.01); *H04L 2209/56* (2013.01)

(58) Field of Classification Search
CPC .................................................. H04L 9/0637
USPC ........................................................ 713/189
See application file for complete search history.

(56) References Cited

U.S. PATENT DOCUMENTS

| | | | |
|---|---|---|---|
| 10,142,312 | B2 | 11/2018 | Johnsrud et al. |
| 2016/0330034 | A1 | 11/2016 | Back et al. |
| 2017/0132626 | A1 | 5/2017 | Kennedy |

(Continued)

FOREIGN PATENT DOCUMENTS

| | | |
|---|---|---|
| CN | 104092767 | 10/2014 |
| CN | 106874087 | 6/2017 |

(Continued)

OTHER PUBLICATIONS

Bitcoin and Cryptocurrency Technologies, Princeton University Press, Feb. 2016, pp. 279-285.

(Continued)

*Primary Examiner* — Peter C Shaw
(74) *Attorney, Agent, or Firm* — Fish & Richardson P.C.

(57) ABSTRACT

A subscription request initiated by a blockchain node associated with a first blockchain is received by a cross-blockchain interaction end, where the subscription request includes a subscription condition. A message that satisfies the subscription condition is obtained by the cross-blockchain interaction end and from a publishing client that corresponds to a second blockchain. The message is sent to a subscribing client that corresponds to the blockchain node a from the cross-blockchain interaction end, where the blockchain node calls a first smart contract associated with the first blockchain to trigger a corresponding contract operation based on the message.

17 Claims, 14 Drawing Sheets

(56) References Cited

U.S. PATENT DOCUMENTS

| | | |
|---|---|---|
| 2017/0244757 A1 | 8/2017 | Castinado et al. |
| 2018/0019867 A1 | 1/2018 | Davis |
| 2018/0113752 A1 | 4/2018 | Derbakova et al. |
| 2018/0294966 A1* | 10/2018 | Hyun .................... H04L 9/3236 |
| 2019/0013933 A1* | 1/2019 | Mercuri ................ G06F 21/602 |
| 2019/0050854 A1 | 2/2019 | Yang et al. |
| 2019/0116142 A1* | 4/2019 | Chalakudi ........... H04L 67/1097 |
| 2019/0156938 A1 | 5/2019 | Brunner |
| 2019/0305935 A1 | 10/2019 | Qiu |

FOREIGN PATENT DOCUMENTS

| | | |
|---|---|---|
| CN | 106960388 | 7/2017 |
| CN | 107103473 | 8/2017 |
| CN | 107231299 | 10/2017 |
| CN | 107248076 | 10/2017 |
| CN | 107301536 | 10/2017 |
| CN | 107742210 | 2/2018 |
| TW | M554608 | 1/2018 |
| TW | 1614713 | 2/2018 |
| WO | WO 2018006072 | 1/2018 |

OTHER PUBLICATIONS bubifans.com [online], "Chain Interoperability," Sep. 2016, retrieved from Jun. 14, 2019, retrieved from URL<https://www.bubifans.com/ueditor/php/upload/file/20181015/1539602892605747.pdf>, 25 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/US2019/024520, dated Jun. 14, 2019, 9 pages.

* cited by examiner

A subscribing client obtains a message generated by a second smart contract in a second blockchain, where the message is obtained by a cross-blockchain interaction end between a first blockchain and the second blockchain from the second blockchain, and the message satisfies a subscription condition provided by a blockchain node in the first blockchain to the cross-blockchain interaction end ⟶ 202

The subscribing client provides the message to the blockchain node, to trigger the blockchain node to call a first smart contract in the first blockchain ⟶ 204

CROSS-BLOCKCHAIN INTERACTION METHOD, APPARATUS, SYSTEM, AND ELECTRONIC DEVICE

CROSS-REFERENCE TO RELATED APPLICATIONS

This application is a continuation of U.S. patent application Ser. No. 16/374,273, filed on Apr. 3, 2019, which claims priority to Chinese Patent Application No. 201810290446.0, filed on Apr. 3, 2018, and each application is hereby incorporated by reference in its entirety.

TECHNICAL FIELD

One or more implementations of the present application relate to the field of blockchain technologies, and in particular, to a cross-blockchain interaction method, apparatus, and system, and an electronic device.

BACKGROUND

Blockchain technology (also referred to as a distributed ledger technology) is a decentralized distributed database technology, and is characterized by decentralization, openness and transparency, temper-resistance, trustworthiness, etc. Therefore, the blockchain technology is applicable to many application scenarios requiring high data reliability.

SUMMARY

In view of this, one or more implementations of the present application provide a cross-blockchain interaction method, apparatus, and system, and an electronic device.

To achieve the previous objective, the one or more implementations of the present application provide the following technical solutions:

According to a first aspect of the one or more implementations of the present application, a cross-blockchain interaction system is provided, including the following: a first blockchain and a second blockchain; a subscribing client, where the subscribing client corresponds to a blockchain node in the first blockchain, and is configured to maintain a message queue corresponding to the blockchain node, and the message queue includes a message that the blockchain node subscribes; a publishing client, where the publishing client corresponds to the second blockchain, and is configured to obtain a message generated by a second smart contract in the second blockchain; and a cross-blockchain interaction end, where the cross-blockchain interaction end obtains a subscription condition of the blockchain node, and requests a message that satisfies the subscription condition from the publishing client and sends the message to the subscribing client to update the message to the message queue when the message queue does not include a message that satisfies the subscription condition, where the blockchain node calls a first smart contract in the first blockchain to trigger a corresponding contract operation when determining that the message queue includes a message that satisfies the subscription condition.

According to a second aspect of the one or more implementations of the present application, a cross-blockchain interaction method is provided, including the following: determining, by a blockchain node in a first blockchain, a message generated by a second smart contract in a second blockchain by using a cross-blockchain interaction end between the first blockchain and the second blockchain; and calling, by the blockchain node, a first smart contract in the first blockchain to trigger a corresponding contract operation when the message generated by the second smart contract satisfies a subscription condition of the blockchain node.

According to a third aspect of the one or more implementations of the present application, a cross-blockchain interaction method is provided, including the following: obtaining, by a subscribing client, a message generated by a second smart contract in a second blockchain, where the message is obtained by a cross-blockchain interaction end between a first blockchain and the second blockchain from the second blockchain, and the message satisfies a subscription condition provided by a blockchain node in the first blockchain to the cross-blockchain interaction end; and providing, by the subscribing client, the message to the blockchain node, to trigger the blockchain node to call a first smart contract in the first blockchain.

According to a fourth aspect of the one or more implementations of the present application, a cross-blockchain interaction method is provided, including the following: obtaining, by a cross-blockchain interaction end, a subscription request initiated by a blockchain node in a first blockchain, where the subscription request includes a subscription condition; obtaining, by the cross-blockchain interaction end, a message that satisfies the subscription condition and is generated by a second smart contract in a second blockchain; and providing, by the cross-blockchain interaction end, the message to the blockchain node, so that the blockchain node calls a first smart contract in the first blockchain based on the message.

According to a fifth aspect of the one or more implementations of the present application, a cross-blockchain interaction method is provided, including the following: obtaining, by a publishing client, a message generated by a second smart contract in a second blockchain; and providing, by the publishing client, the message to a blockchain node in a first blockchain by using a cross-blockchain interaction end between the first blockchain and the second blockchain, so as to trigger the blockchain node to call a first smart contract in the first blockchain.

According to a sixth aspect of the one or more implementations of the present application, a cross-blockchain interaction apparatus is provided, including the following: a determining unit, configured to determine a message generated by a second smart contract in a second blockchain by using a cross-blockchain interaction end between a first blockchain and the second blockchain; and a calling unit, configured to call a first smart contract in the first blockchain to trigger a corresponding contract operation when the message generated by the second smart contract satisfies a subscription condition of the blockchain node.

According to a seventh aspect of the one or more implementations of the present application, a cross-blockchain interaction apparatus is provided, including the following: an acquisition unit, configured to obtain a message generated by a second smart contract in a second blockchain, where the message is obtained by a cross-blockchain interaction end between a first blockchain and the second blockchain from the second blockchain, and the message satisfies a subscription condition provided by a blockchain node in the first blockchain to the cross-blockchain interaction end; and a providing unit, configured to provide the message to the blockchain node, to trigger the blockchain node to call a first smart contract in the first blockchain.

According to an eighth aspect of the one or more implementations of the present application, a cross-blockchain interaction apparatus is provided, including the following: a request acquisition unit, configured to obtain a subscription request initiated by a blockchain node in a first blockchain, where the subscription request includes a subscription condition; a message acquisition unit, configured to obtain a message that satisfies the subscription condition and is generated by a second smart contract in a second blockchain; and a providing unit, configured to provide the message to the blockchain node, so that the blockchain node calls a first smart contract in the first blockchain based on the message.

According to a ninth aspect of the one or more implementations of the present application, a cross-blockchain interaction apparatus is provided, including the following: an acquisition unit, configured to obtain a message generated by a second smart contract in a second blockchain; and a providing unit, configured to provide the message to a blockchain node in a first blockchain by using a cross-blockchain interaction end between the first blockchain and the second blockchain, so as to trigger the blockchain node to call a first smart contract in the first blockchain.

According to a tenth aspect of the one or more implementations of the present application, an electronic device is provided, including the following: a processor; and a memory, configured to store an instruction that can be executed by the processor, where the processor is configured to implement the method according to any one of the previous implementations.

According to an eleventh aspect of the one or more implementations of the present application, a cross-blockchain interaction system is provided, including the following: a first blockchain and a second blockchain; a subscribing client, where the subscribing client corresponds to a blockchain node in the first blockchain, and is configured to maintain a message queue corresponding to the blockchain node, and the message queue includes a message that the blockchain node subscribes; a publishing client, where the publishing client corresponds to the second blockchain, and is configured to obtain a message generated by a second smart contract in the second blockchain; and a cross-blockchain interaction end, where the cross-blockchain interaction end obtains a subscription condition of the blockchain node, and requests a message that satisfies the subscription condition from the publishing client and sends the message to the subscribing client to update the message to the message queue when the message queue does not include a message that satisfies the subscription condition, where the blockchain node calls a first smart contract in the first blockchain to trigger a corresponding contract operation, where the subscription condition is related to the contract operation, so that the blockchain node completes the contract operation when determining that the message queue includes a message that satisfies the subscription condition.

BRIEF DESCRIPTION OF DRAWINGS

FIG. 2 is a flowchart illustrating another cross-blockchain interaction method, according to an example implementation;

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described below do not represent all implementations consistent with one or more implementations of the present application. On the contrary, the implementations are only examples of apparatuses and methods that are described in the appended claims in detail and consistent with some aspects of one or more implementations of the present application.

It is worthwhile to note that in other implementations, steps in the corresponding method are not necessarily performed according to the sequence shown and described in the present application. In some other implementations, the method can include steps more or fewer than those described in the present application. In addition, a single step described in the present application can be decomposed into a plurality of steps in other implementations, and a plurality of steps described in the present application can be combined into a single step in other implementations.

Figure 1:
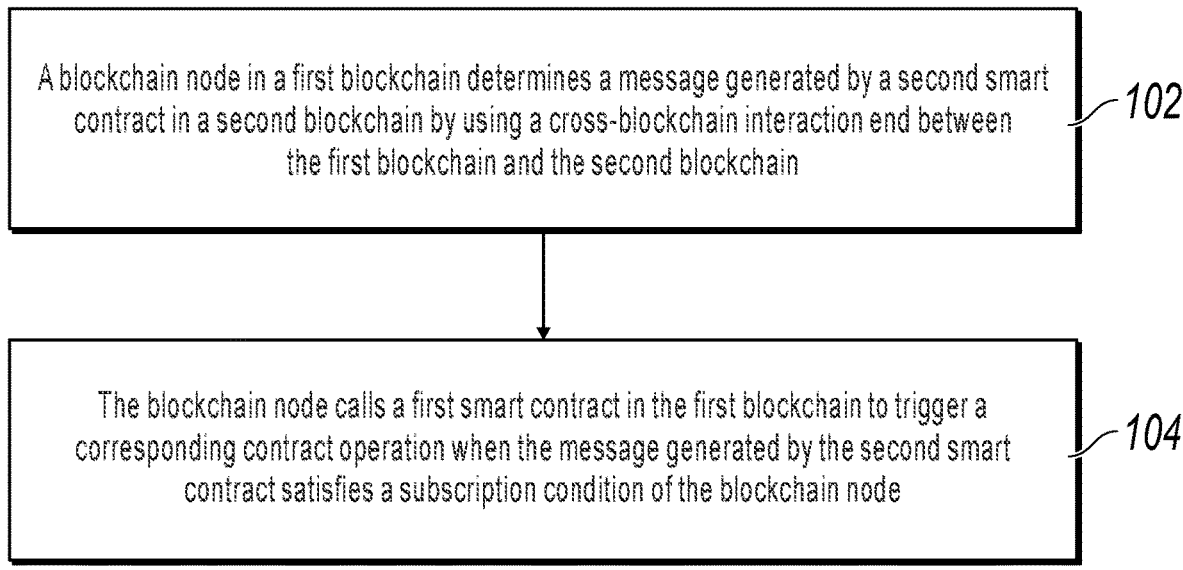
FIG. 1 is a flowchart illustrating a cross-blockchain interaction method, according to an example implementation.

FIG. 1 is a flowchart illustrating a cross-blockchain interaction method, according to an example implementation. As shown in FIG. 1, the method is applied to a blockchain node in a first blockchain, and can include the following steps.

Step 102: The blockchain node in the first blockchain determines a message generated by a second smart contract in a second blockchain by using a cross-blockchain interaction end between the first blockchain and the second blockchain.

In an implementation, the cross-blockchain interaction end is disposed between the first blockchain and the second blockchain, so that the first blockchain and the second blockchain can exchange messages based on the cross-blockchain interaction end, thereby implementing cross-blockchain interaction between a plurality of blockchains.

In an implementation, the first blockchain represents a party that receives an interaction message in cross-blockchain interaction, and the second blockchain represents a party that provides the interaction message in cross-blockchain interaction. In other words, "first blockchain" and "second blockchain" depend on roles that corresponding blockchains play in cross-blockchain interaction, instead of limiting a certain blockchain to the first blockchain or the second blockchain. In other words, when a blockchain receives an interaction message from another blockchain in cross-blockchain interaction, the blockchain is a "first blockchain" in this process; and when a blockchain provides an interaction message to another blockchain in cross-blockchain interaction, the blockchain is a "second blockchain" in this process.

In an implementation, the message obtained by the blockchain node includes a message that satisfies a subscription condition of the blockchain node and is generated by the second smart contract in the second blockchain. For example, user A needs to transfer asset 1 to user B in the second blockchain and user B needs to transfer asset 2 to user A in the first blockchain. In this case, user A first transfers asset 1 to user B by calling the second smart contract in the second blockchain, and after the first blockchain receives an operation completion message corresponding to this operation, user B transfers asset 2 to user A by calling a first smart contract in the first blockchain. In the previous asset transfer process between user A and user B, the subscription condition of the blockchain node in the first blockchain can be "received a message indicating that user A has transferred asset 1 to user B". Therefore, the blockchain node needs to obtain a message of "user A has transferred asset 1 to user B" that is generated by the second smart contract in the second blockchain, to trigger the blockchain node to call the first smart contract. As such, user B can transfer asset 2 to user A.

In an implementation, the blockchain node can initiate a subscription request to the cross-blockchain interaction end, where the subscription request is used to indicate the subscription condition to the cross-blockchain interaction end, so that the cross-blockchain interaction end obtains a message that satisfies the subscription condition and is generated by the second smart contract, and adds the message to a message queue maintained by a subscribing client corresponding to the blockchain node. Then the blockchain node determines that the second smart contract has generated a message that satisfies the subscription condition when the message queue includes a message that satisfies the subscription condition.

Step 104: The blockchain node calls a first smart contract in the first blockchain to trigger a corresponding contract operation when the message generated by the second smart contract satisfies a subscription condition of the blockchain node.

In an implementation, the cross-blockchain interaction end obtains the message generated by the second smart contract in the second blockchain, and triggers the blockchain node in the first blockchain to call the first smart contract based on the message, so that the first blockchain and the second blockchain can implement reliable cross-blockchain interaction of the message. As such, the message generated by the second smart contract is asynchronously sent to the first smart contract, to automatically trigger calling the first smart contract, ensuring that the corresponding contract operation can be performed efficiently in time.

FIG. 2 is a flowchart illustrating another cross-blockchain interaction method, according to an example implementation. As shown in FIG. 2, the method is applied to a subscribing client, and can include the following steps.

Step 202: The subscribing client obtains a message generated by a second smart contract in a second blockchain, where the message is obtained by a cross-blockchain interaction end between a first blockchain and the second blockchain from the second blockchain, and the message satisfies a subscription condition provided by a blockchain node in the first blockchain to the cross-blockchain interaction end.

In an implementation, the subscribing client can be configured on the blockchain node, in other words, the subscribing client can be understood as a message subscription function that is implemented or extended on the blockchain node. In other implementations, the subscribing client can be configured on a node outside the first blockchain. Implementations are not limited in the present application.

Step 204: The subscribing client provides the message to the blockchain node, to trigger the blockchain node to call a first smart contract in the first blockchain.

In an implementation, the subscribing client can maintain a message queue corresponding to the blockchain node, and the message queue includes a message that the blockchain node subscribes, in other words, the subscribing client adds a message that satisfies the subscription condition provided by the blockchain node to the message queue, so that the blockchain node can consume the message included in the message queue.

In an implementation, subscribing clients are in a one-to-one correspondence with blockchain nodes so that the cross-blockchain interaction end can perform mapping to a corresponding blockchain node based on a subscribing client, ensuring accurate message transfer. In other implementations, one subscribing client can correspond to a plurality of blockchain nodes. For example, the subscribing client can maintain a plurality of message queues that are in a one-to-one correspondence with a plurality of blockchain nodes, so as to perform mapping to a corresponding blockchain node by using a message queue.

In an implementation, the subscribing client can provide a queue status of the message queue to the cross-blockchain interaction end, and the queue status indicates a message included in the message queue. Correspondingly, if the queue status indicates that the message queue includes a message that satisfies the subscription condition, the cross-blockchain interaction end does not need to obtain the message again. If the queue status indicates that the message queue does not include a message that satisfies the subscription condition, the cross-blockchain interaction end can obtain a message that satisfies the subscription condition and is generated by the second smart contract in the second blockchain, so as to update the message to the message queue.

In an implementation, the subscribing client can receive a status query request initiated by the cross-blockchain interaction end, so as to return the queue status to the cross-blockchain interaction end in response to the status query request. In other words, both the message queue and the queue status of the message queue are maintained by the subscribing client corresponding to the blockchain node instead of the cross-blockchain interaction end, reducing malicious behaviors performed by the related personnel on the cross-blockchain interaction end, and improving message transfer reliability.

In an implementation, the subscribing client can add the message to the message queue, and the subscribing client can trigger an arrival event of the message in the first blockchain, so as to trigger the blockchain node to consume the message queue. In this case, the blockchain node can be triggered to call the first smart contract when determining that the message queue includes a message that satisfies the subscription condition and is generated by the second smart contract.

In an implementation, the subscribing client can perform verification on the message provided by the cross-blockchain interaction end by using a pre-anchored verification root, so as to provide the message to the blockchain node after the message is verified. In a situation, the subscribing client can actively verify whether the message actually exists in the second blockchain. For example, a simplified payment verification (SPV) client can be configured on the subscribing client, the SPV client maintains a simplified blockchain (including a header of each block only) corresponding to the second blockchain, and the verification root can include the simplified blockchain. Therefore, whether the message actually exists in the second blockchain can be determined based on the message. In another situation, a predetermined oracle client different from the subscribing client can verify whether the message actually exists in the second blockchain, and the subscribing client has an absolute trust in the oracle client. In this case, the oracle client can add a signature of the oracle client to the message when determining that the message actually exists in the second blockchain. Because the verification root can include verification information for the signature, the subscribing client can determine that the oracle client has verified that the message actually exists in the second blockchain when verifying that the signature is actually from the oracle client. If the signature of the message is not verified, the subscribing client considers that the message does not actually exist in the second blockchain, and therefore can discard the message. Certainly, the subscribing client can perform verification on the message in another way. Implementations are not limited in the present application.

In an implementation, a corresponding contract operation can be triggered when the first smart contract is called. An execution process of the contract operation can be independent of the previous message, in other words, the message is merely used to trigger calling the first smart contract. Or the previous message can be applied to an execution process of the contract operation, for example, the message is used as input information of the contract operation, and therefore is involved in the execution process of the contract operation.

Figure 3:
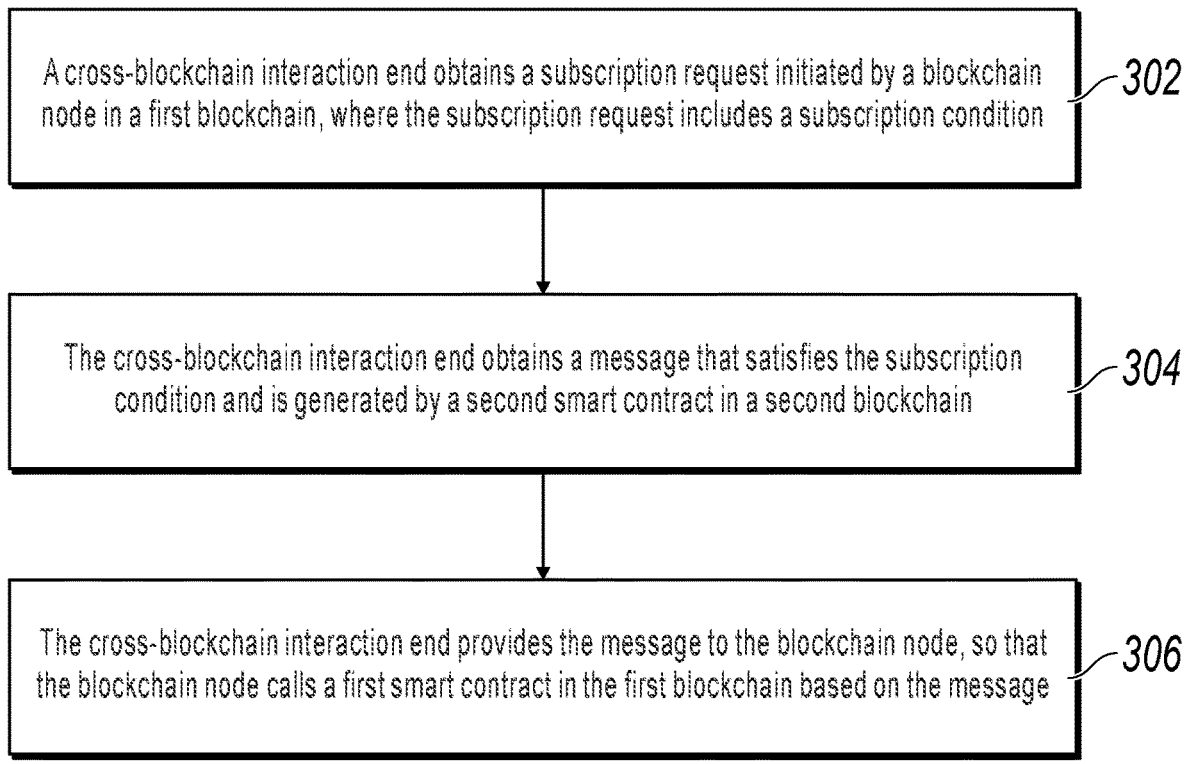
FIG. 3 is a flowchart illustrating still another cross-blockchain interaction method, according to an example implementation.

FIG. 3 is a flowchart illustrating still another cross-blockchain interaction method, according to an example implementation. As shown in FIG. 3, the method is applied to a cross-blockchain interaction end, and can include the following steps.

Step 302: The cross-blockchain interaction end obtains a subscription request initiated by a blockchain node in a first blockchain, where the subscription request includes a subscription condition.

In an implementation, the cross-blockchain interaction end can initiate a status query request to a subscribing client corresponding to the blockchain node, the subscribing client maintains a message queue corresponding to the blockchain node, and the message queue includes a message that the blockchain node subscribes. Then the cross-blockchain interaction end receives a queue status of the message queue that is returned by the subscribing client, so as to obtain a message that satisfies the subscription condition and is generated by a second smart contract in a second blockchain when determining that the message queue does not include a message that satisfies the subscription condition based on the queue status. Certainly, if the queue status indicates that the message queue includes a message that satisfies the subscription condition, the cross-blockchain interaction end does not need to obtain the message again. In other words, both the message queue and the queue status of the message queue are maintained by the subscribing client corresponding to the blockchain node instead of the cross-blockchain interaction end, so as to reduce malicious behaviors performed by the related personnel on the cross-blockchain interaction end, and improving message transfer reliability.

Step 304: The cross-blockchain interaction end obtains a message that satisfies the subscription condition and is generated by a second smart contract in a second blockchain.

In an implementation, the cross-blockchain interaction end can be connected to predetermined storage space in the second blockchain through bridging by using a publishing client (the publishing client is used to connect the cross-blockchain interaction end and the predetermined storage space through bridging). The predetermined storage space is used to store messages generated by the second smart contract. Then the cross-blockchain interaction end queries whether the predetermined storage space includes a message that satisfies the subscription condition by using a query interface provided by the publishing client. The cross-blockchain interaction end can initiate a message acquisition request to the publishing client, so that the publishing client obtains a message that satisfies the subscription condition from the predetermined storage space and returns the message to the cross-blockchain interaction end.

In an implementation, the publishing client functions as a bridge, so that the cross-blockchain interaction end only needs to implement connection to the publishing client without learning how the publishing client is connected to the predetermined storage space through bridging, how the publishing client obtains a related message, etc., thereby simplifying configuration of the cross-blockchain interaction end and reducing system complexity.

In an implementation, the predetermined storage space can include at least one of the following: a third smart contract in the second blockchain and a predetermined blockchain data structure in the second blockchain. In one example where the predetermined storage space includes the third smart contract in the second blockchain, the third smart contract can be exclusively used to store a message generated by the second smart contract. In another example where the predetermined storage space includes the predetermined blockchain data structure, provided that the publishing client knows the predetermined blockchain data structure, the publishing client can be accurately connected to the predetermined storage space through bridging by obtaining the predetermined blockchain data structure included in a blockchain ledger in the second blockchain. Certainly, the predetermined storage space can further include other forms, and the forms are not limited in the present application.

Step 306: The cross-blockchain interaction end provides the message to the blockchain node, so that the blockchain node calls a first smart contract in the first blockchain based on the message.

Figure 4:
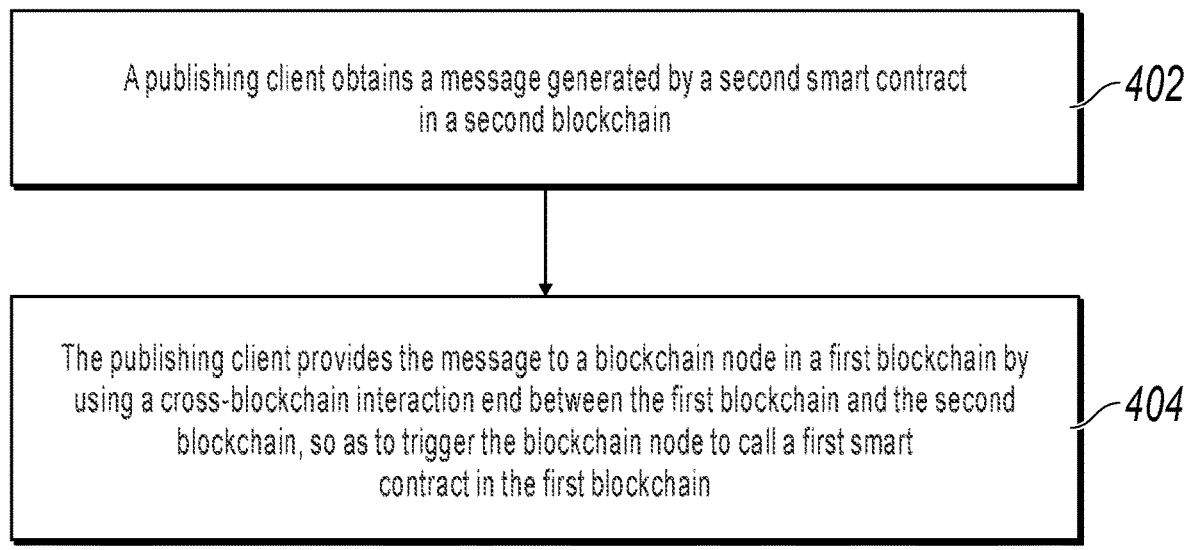
FIG. 4 is a flowchart illustrating yet another cross-blockchain interaction method, according to an example implementation.

FIG. 4 is a flowchart illustrating yet another cross-blockchain interaction method, according to an example implementation. As shown in FIG. 4, the method is applied to a publishing client, and can include the following steps.

Step 402: The publishing client obtains a message generated by a second smart contract in a second blockchain.

In an implementation, the publishing client is connected to predetermined storage space in the second blockchain through bridging, the predetermined storage space is used to store a message generated by the second smart contract, and the publishing client can obtain the message generated by the second smart contract from the predetermined storage space.

In an implementation, the predetermined storage space can include at least one of the following: a third smart contract in the second blockchain and a predetermined blockchain data structure in the second blockchain. For example, the third smart contract can be exclusively used to store a message generated by the second smart contract. In this case, provided that the publishing client knows the predetermined blockchain data structure, the publishing client can be accurately connected to the predetermined storage space through bridging by obtaining the predetermined blockchain data structure included in a blockchain ledger in the second blockchain. Certainly, the predetermined storage space can further include other forms, and the forms are not limited in the present application.

In an implementation, a query interface for the predetermined storage space is configured for the publishing client. The publishing client can open the query interface to a cross-blockchain interaction end, so that the cross-blockchain interaction end performs a query in the predetermined storage space by using the query interface. The publishing client can obtain a message identified by the cross-blockchain interaction end based on a message acquisition request initiated by the cross-blockchain interaction end, and return the message to the cross-blockchain interaction end. The message identified by the cross-blockchain interaction end matches a subscription condition provided by a blockchain node to the cross-blockchain interaction end.

Step 404: The publishing client provides the message to a blockchain node in a first blockchain by using a cross-blockchain interaction end between the first blockchain and the second blockchain, so as to trigger the blockchain node to call a first smart contract in the first blockchain.

In an implementation, the publishing client can receive the message acquisition request initiated by the cross-blockchain interaction end, and the message acquisition request matches the subscription condition provided by the blockchain node to the cross-blockchain interaction end. Then the publishing client can send a message that matches the message acquisition request and is generated by the second smart contract to the cross-blockchain interaction end, so that the cross-blockchain interaction end provides the message to the blockchain node.

In an implementation, the publishing client can add a signature to the verified message based on a result of verification performed on the obtained message. The publishing client can send the message to a subscribing client corresponding to the blockchain node by using the cross-blockchain interaction end, so that the subscribing client adds the message to a message queue corresponding to the blockchain node after the signature is verified by the subscribing client. The blockchain node calls the first smart contract when determining that the message queue includes a message that satisfies the subscription condition. An oracle function can be configured on the publishing client (which means the publishing client can be implemented as an oracle client), so that the publishing client can perform verification on the obtained message, to determine whether the message actually exists in the second blockchain. The publishing client can add a signature to the message when determining that the message actually exists in the second blockchain, so that after the signature is verified by the subscribing client, the subscribing client can directly determine that the publishing client has verified that the message actually exists in the second blockchain, without actively performing verification.

Figure 5:
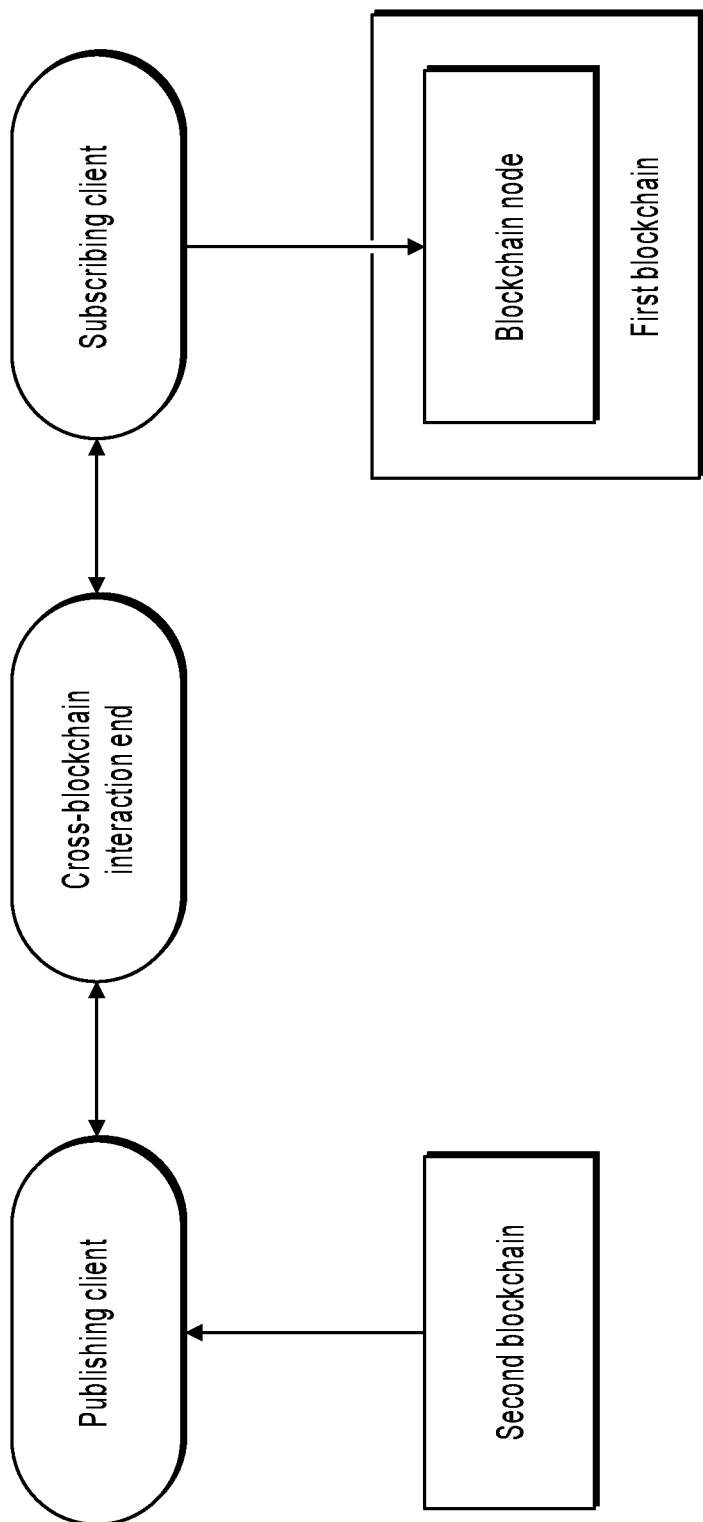
FIG. 5 is an architectural diagram illustrating a cross-blockchain interaction system, according to an example implementation.

FIG. 5 is an architectural diagram illustrating a cross-blockchain interaction system, according to an example implementation. As shown in FIG. 5, the cross-blockchain interaction system can include a first blockchain and a second blockchain; a subscribing client; a publishing client; and a cross-blockchain interaction end.

In the present application, the first blockchain is a blockchain as a message subscriber, and the second blockchain is a blockchain as a message publisher. In other words, "first blockchain" and "second blockchain" are merely used to distinguish between roles that different blockchains play, instead of limiting a certain blockchain to the first blockchain or the second blockchain.

The subscribing client corresponds to a blockchain node in the first blockchain, and is configured to maintain a message queue corresponding to the blockchain node, and the message queue includes a message that the blockchain node subscribes. In an implementation, the subscribing client can be configured on a device, a node, a platform, etc. outside the first blockchain. In another implementation, the subscribing client can be configured on a blockchain node in the first blockchain, and is equivalent to a subscription function that the blockchain node extends from a related technology.

The publishing client corresponds to the second blockchain, and is configured to obtain a message generated by a second smart contract in the second blockchain. Based on a distributed accounting feature of a blockchain, all blockchain nodes in the second blockchain can maintain all accounting data of the same content through consensus, namely, a blockchain ledger. The publishing client can obtain, from the blockchain ledger, a message that can be published, so that the cross-blockchain interaction end obtains the message. In an implementation, the publishing client can be configured on a device, a node, a platform, etc. outside the second blockchain. In another implementation, the publishing client can be configured on a blockchain node in the second blockchain, and is equivalent to a publishing function that the blockchain node extends from a related technology.

The cross-blockchain interaction end can receive a subscription request initiated by the blockchain node in the first blockchain, and the subscription request includes a subscription condition indicating a subscription requirement of the blockchain node. The cross-blockchain interaction end can initiate a status query message to the subscribing client, and determine whether the message queue includes a message that satisfies the subscription condition based on a queue status of the message queue that is returned by the subscribing client. If yes, the cross-blockchain interaction end does not need to obtain the message again. If no, the cross-blockchain interaction end needs to obtain a message that satisfies the subscription condition from the publishing client. The cross-blockchain interaction end can request a message that satisfies the subscription condition from the publishing client, and send the message returned by the publishing client to the subscribing client, so that the subscribing client updates the message to the message queue for the blockchain node in the first blockchain to consume. The cross-blockchain interaction end only transfers messages between the publishing client and the subscribing client, and does not need to make the message persistent. In an implementation, the cross-blockchain interaction end can be configured on a device, a node, a platform, etc. outside the first blockchain and the second blockchain. In another implementation, the cross-blockchain interaction end can be configured on a blockchain node in the first blockchain, and is equivalent to a cross-blockchain interaction function that the blockchain node extends from a related technology. In another implementation, the cross-blockchain interaction end can be configured on a blockchain node in the second blockchain, and is equivalent to a cross-blockchain interaction function that the blockchain node extends from a related technology.

In a situation, the message generated by the second smart contract can be an asynchronous message. The blockchain node in the first blockchain can provide the subscription condition to the cross-blockchain interaction end, so that the cross-blockchain interaction end obtains the asynchronous message. After obtaining the asynchronous message by using the publishing client, the cross-blockchain interaction end can send the asynchronous message to the subscribing client, so that the subscribing client adds the asynchronous message to the message queue. The subscribing client can trigger an arrival event of the message in the first blockchain, so that the blockchain node in the first blockchain can be triggered to call a first smart contract when determining that the message queue includes the asynchronous message.

In another situation, the message generated by the second smart contract can be a synchronous message. The blockchain node in the first blockchain can call the first smart contract to trigger a corresponding contract operation. In an execution process of the contract operation, the synchronous message needs to be used as input information. Therefore, the blockchain node can provide the subscription condition to the cross-blockchain interaction end, so that the cross-blockchain interaction end obtains the synchronous message. After obtaining the synchronous message by using the publishing client, the cross-blockchain interaction end can send the synchronous message to the subscribing client, so that the subscribing client adds the synchronous message to the message queue. The subscribing client can trigger an arrival event of the message in the first blockchain, so as to trigger the contract operation to be further performed. The contract operation cannot be performed until the arrival event of the message is detected.

Based on the subscribing client, the publishing client, the cross-blockchain interaction end, etc. in the implementation shown in FIG. 5, the message queue corresponding to the blockchain node in the first blockchain is maintained by the subscribing client corresponding to the blockchain node, and a status of consuming a message in the message queue by the blockchain node is maintained on the blockchain node, but none of the cross-blockchain interaction end, the publishing client, etc. needs to maintain the consumption status. As such, the cross-blockchain interaction end, the publishing client, etc. are prevented from providing incorrect or invalid messages to the subscribing client.

A message provided by the cross-blockchain interaction end to the subscribing client is from the publishing client, and a message provided by the publishing client is from the second blockchain. The publishing client does not maintain the queue status of the message queue, and therefore cannot tamper with message content. In addition, it is meaningless for the cross-blockchain interaction end to tamper with the message content because the subscribing client can perform verification on the content based on a blockchain ledger maintained in the second blockchain. As such, the message content is reliable. For example, the subscribing client actively performs verification on a received message, for example, by using an SPV blockchain that corresponds to the second blockchain and is maintained by the subscribing client, to determine whether the message actually exists in the second blockchain. For another example, the subscribing client can verify whether a signature of the message is from a predetermined oracle client, and determine that the message actually exists in the second blockchain after the signature is verified by the subscribing client.

Figure 6:
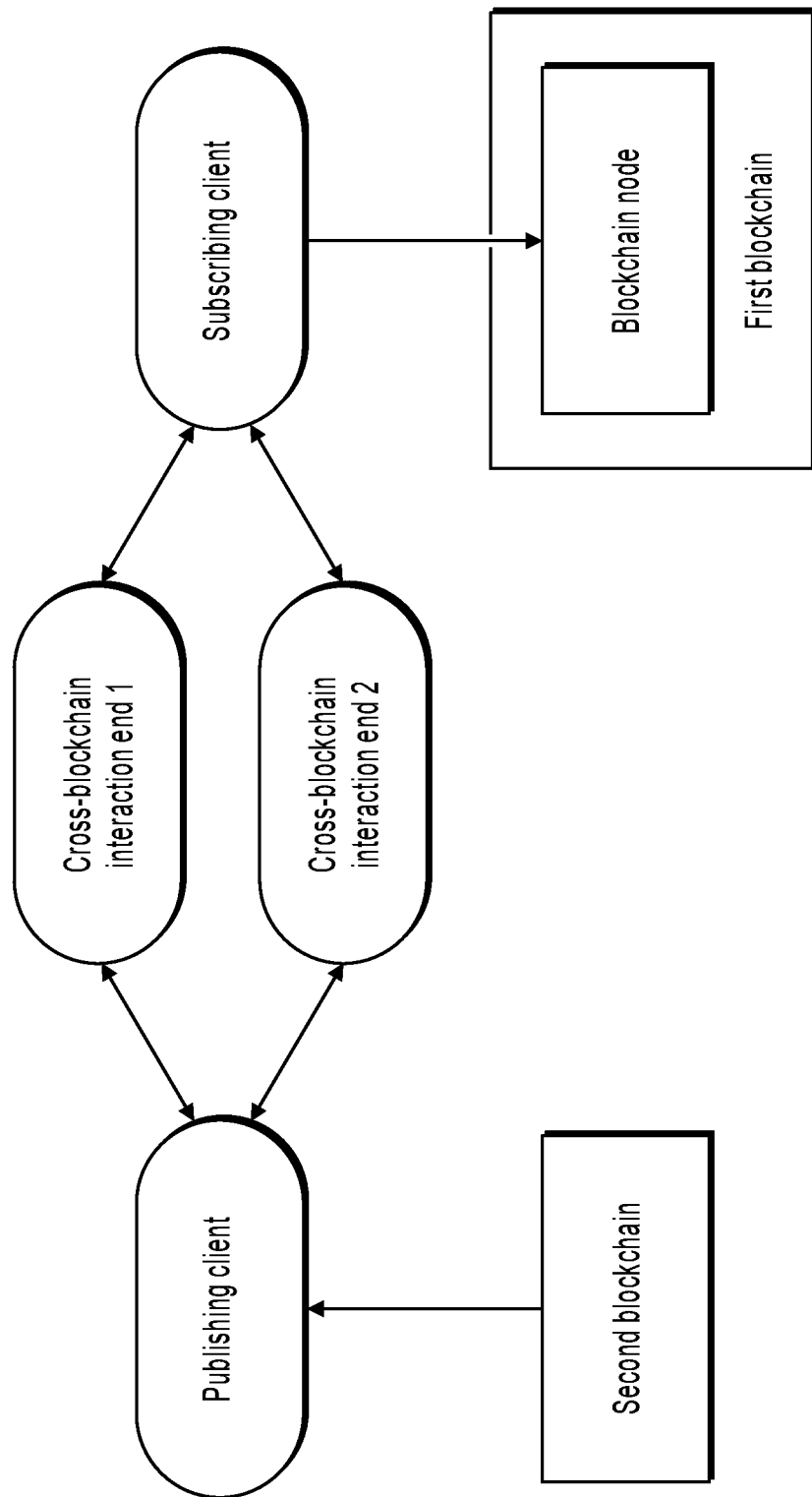
FIG. 6 is an architectural diagram illustrating another cross-blockchain interaction system, according to an example implementation.

In some situations, the cross-blockchain interaction end can initiate a denial of service attack, and therefore the subscribing client cannot obtain a message published by the publishing client. For such situations, as shown in FIG. 6, a plurality of independent cross-blockchain interaction ends such as cross-blockchain interaction end 1, cross-blockchain interaction end 2, etc. can be configured between the subscribing client and the publishing client, so that the subscribing client can still obtain a message published by the publishing client by using cross-blockchain interaction end 2 even if cross-blockchain interaction end 1 initiates a denial of service attack.

Figure 7:
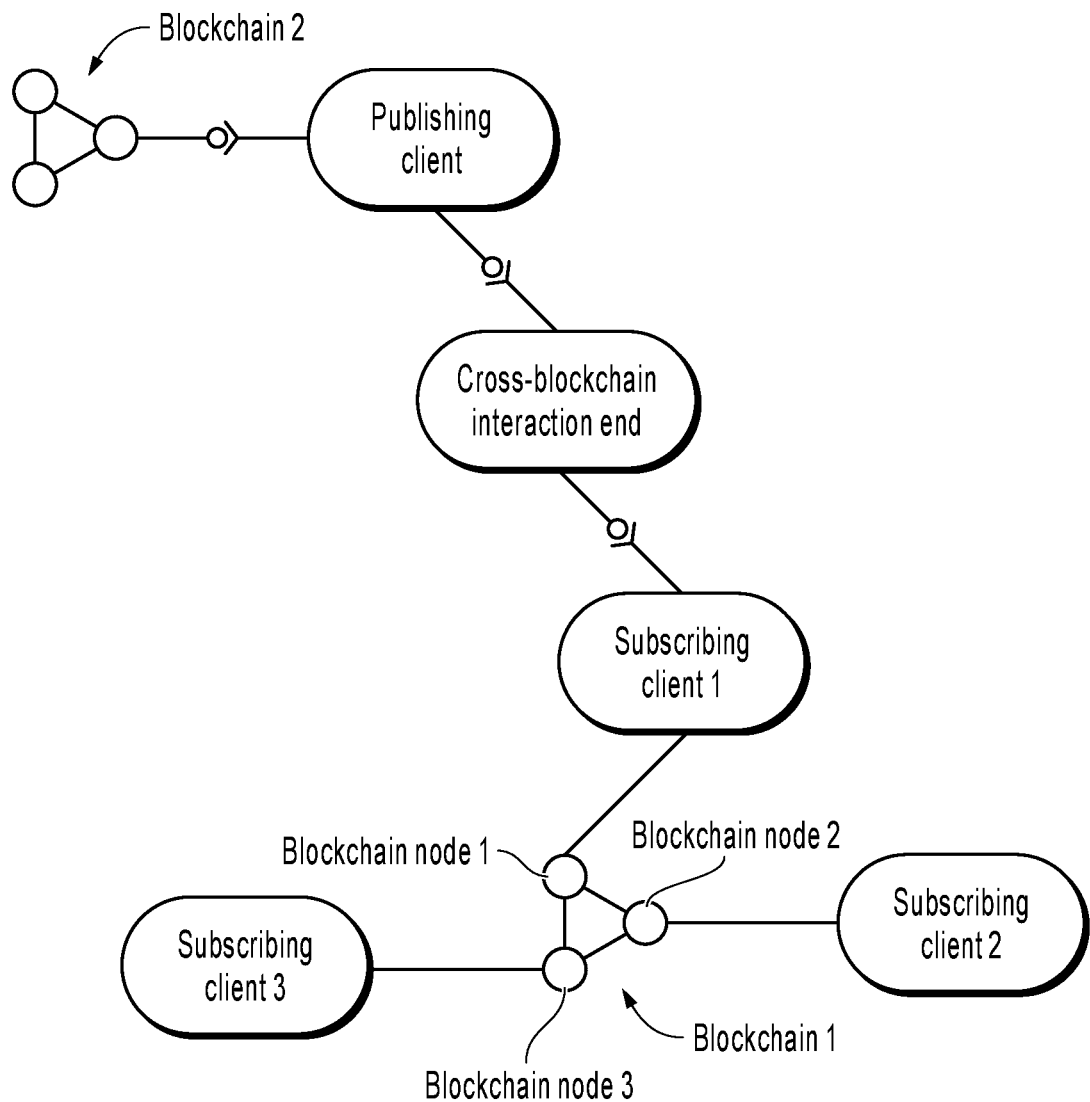
FIG. 7 is a structural diagram illustrating a cross-blockchain transfer-related system, according to an example implementation.

For ease of understanding, technical solutions of one or more implementations of the present application are described by using a cross-blockchain transfer-related scenario as an example. FIG. 7 is a structural diagram illustrating a cross-blockchain transfer-related system, according to an example implementation. As shown in FIG. 7, assume that user A has account A1 in blockchain 1 and account A2 in blockchain 2, and user B has account B1 in blockchain 1 and account B2 in blockchain 2. Account A1 and account B1 in blockchain 1 are used to maintain a type of asset objects (e.g., RMB), and account A2 and account B2 in blockchain 2 are used to maintain another type of asset objects (e.g., Securities). In this case, when user A expects to sell securities to user B, the following transfer-related logic can be used: A specified number of securities are transferred from account A2 to account B2, and then a specified amount of RMB is transferred from account B1 to account A1.

To improve transfer reliability, corresponding smart contracts can be separately set in blockchain 1 and blockchain 2, so that the previous two transfer processes are automatically completed, thereby reducing intentional or unintentional transfer amount errors, delays, etc. caused in a user's manual transfer process, and ensuring a quick and accurate transfer process. Based on the technical solution of the present application, cross-blockchain message exchange can be implemented between blockchain 1 and blockchain 2, so that the transfer operation can be performed from account B1 to account A1 in blockchain 1 after blockchain 1 determines that the transfer operation from account A2 to account B2 is completed.

In the implementation shown in FIG. 7, assume that blockchain 1 includes blockchain node 1, blockchain node 2, blockchain node 3, etc., subscribing client 1 is configured on blockchain node 1, subscribing client 2 is configured on blockchain node 2, subscribing client 3 is configured on blockchain node 3, and so on. Subscribing clients 1 to 3 are not necessarily configured on blockchain nodes 1 to 3, and can be configured on nodes outside blockchain 1. Implementations are not limited in the present application. Subscribing client 1 maintains message queue 1 corresponding to blockchain node 1, and subscribing client 2 maintains message queue 2 corresponding to blockchain node 2, and subscribing client 3 maintains message queue 3 corresponding to blockchain node 3. A corresponding publishing client is configured for blockchain 2. The publishing client can be configured on a blockchain node in blockchain 2, or can be configured on a node outside blockchain 2. Implementations are not limited in the present application. A cross-blockchain interaction end is configured between subscribing clients 1 to 3 and the publishing client. The cross-blockchain interaction end can be configured on a blockchain node in blockchain 1, or can be configured on a blockchain node in blockchain 2, or can be configured on a node outside blockchain 1 and blockchain 2. Implementations are not limited in the present application.

Figure 8:
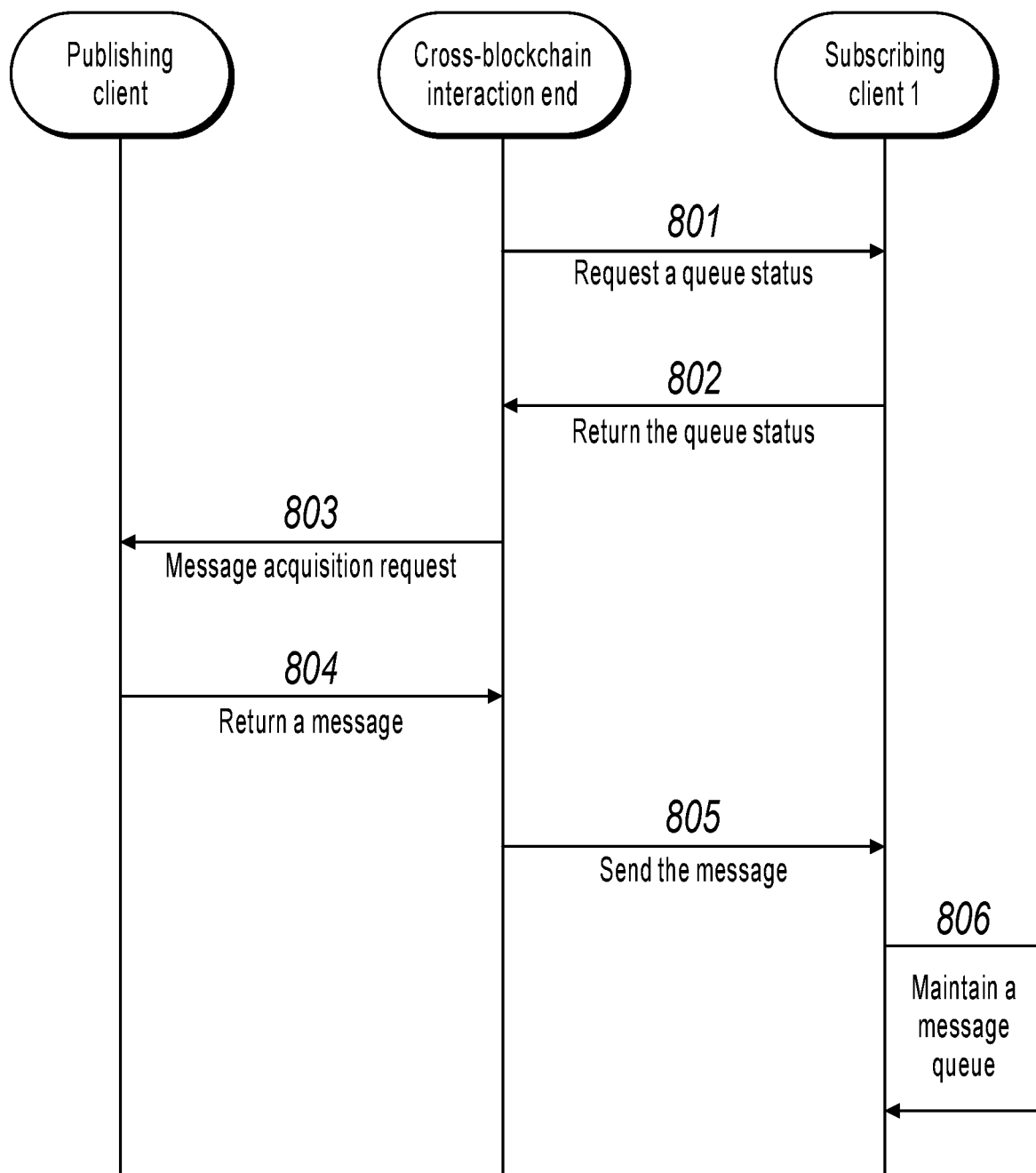
FIG. 8 is a schematic diagram illustrating a cross-blockchain message exchange process, according to an example implementation.

Message queues 1 to 3 respectively maintained by subscribing clients 1 to 3 include messages that blockchain nodes 1 to 3 separately subscribe. Subscribing clients 1 to 3 can maintain queue statuses of message queues 1 to 3 based on respective message consumption statuses in message queues 1-3 by blockchain nodes 1-3. However, neither the cross-blockchain interaction end nor the publishing client needs to maintain the queue statuses. The publishing client can obtain to-be-published messages in blockchain 2, and the cross-blockchain interaction end can query the queue statuses from subscribing clients 1 to 3, and request a corresponding message from the publishing client, so as to update the message to a corresponding message queue. The following uses blockchain node 1 as an example to describe a cross-blockchain message exchange process. FIG. 8 is a schematic diagram illustrating a cross-blockchain message exchange process, according to an example implementation. As shown in FIG. 8, the message exchange process can include the following steps.

Step 801: A cross-blockchain interaction end requests a queue status from subscribing client 1.

Step 802: The cross-blockchain interaction end receives the queue status returned by subscribing client 1.

In an implementation, subscribing client 1 maintains a message queue (namely, message queue 1) corresponding to blockchain node 1, where the message queue includes a message that blockchain node 1 subscribes, and the queue status includes a status of consuming each message by blockchain node 1, so that the cross-blockchain interaction end can know a next message that the cross-blockchain interaction end needs to request to obtain from a publishing client based on the consumption status.

Specifically, blockchain node 1 initiates a subscription request to the cross-blockchain interaction end, and the subscription request includes a subscription condition. In the previously described example of transfer transaction between user A and user B, assume that the subscription condition is that transaction of transferring a specified number of securities from account A2 to account B2 is successfully completed. In this case, the cross-blockchain interaction end can determine, by querying the queue status, whether the message queue maintained by subscribing client 1 includes a message that satisfies the subscription condition, namely, a message indicating that transaction of transferring a specified number of securities from account A2 to account B2 is successful. If a message that satisfies the subscription condition exists, the cross-blockchain interaction end does not need to obtain the message again, and determines that a response is successfully made to the subscription request. If no message that satisfies the subscription condition exists, the cross-blockchain interaction end can determine that the next message to be obtained is the message indicating that transaction of transferring a specified number of securities from account A2 to account B2 is successful, and needs to perform subsequent steps to obtain the next message.

Step 803: The cross-blockchain interaction end initiates a message acquisition request to a publishing client.

In an implementation, in the previously described example of transfer transaction between user A and user B, assume that blockchain node 1 has subscribed to the following message in blockchain 2: the message indicating that transaction of transferring a specified number of securities from account A2 to account B2 is successful. In this case, when determining that the next message to be obtained is the transaction success message based on the queue status, the cross-blockchain interaction end can initiate the corresponding message acquisition request to the publishing client to obtain the transaction success message.

Step 804: The cross-blockchain interaction end obtains a message returned by the publishing client.

In an implementation, the publishing client can determine the message needed by the cross-blockchain interaction end by parsing the message acquisition request. If the publishing client has obtained the transaction success message, the publishing client can directly return the transaction success message to the cross-blockchain interaction end. If the publishing client has not obtained the transaction success message, the publishing client can notify the cross-blockchain interaction end of the acquisition failure, so that the cross-blockchain interaction end can initiate a query repeatedly based on a predetermined period, until the publishing client has obtained the transaction success message. In some situations, if the publishing client has not obtained the transaction success message, the publishing client can monitor the transaction success message, and actively send the transaction success message to the cross-blockchain interaction end after determining that the transaction success message is obtained.

In an implementation, the transfer operation performed from account A2 to account B2 in blockchain 2 can be completed by a blockchain node in blockchain 2 by calling a smart contract, or can be automatically triggered by a smart contract based on a predetermined trigger condition. Implementations are not limited in the present application.

Step 805: The cross-blockchain interaction end sends the obtained message to subscribing client 1.

In an implementation, the cross-blockchain interaction end is only responsible for a data transfer function between subscribing client 1 and the publishing client, but does not maintain the message queue or the queue status, or focus on data content, or need to perform persistent processing on data. Simply, the cross-blockchain interaction end only functions as a "pipeline" for data transfer.

Step 806: Subscribing client 1 adds the message sent by the cross-blockchain interaction end to a message queue, to maintain the message queue.

In an implementation, subscribing client 1 or blockchain node 1 can perform verification on the received message to ensure that the message is actually from blockchain 2 and content is reliable and untampered. Subscribing client 1 or blockchain node 1 can use various verification methods. The methods are not limited in the present application. For example, subscribing client 1 or blockchain node 1 can check whether a block where the message is located in blockchain 2 is in the longest chain and determine the number of blocks following the block. The message is verified if the block where the message is located is in the longest chain and the number of blocks following the block is not less than 6. For another example, subscribing client 1 or blockchain node 1 can perform verification on the message based on a PBFT algorithm or by using an oracle. For still another example, subscribing client 1 or blockchain node 1 can perform verification on the message by using a configured SPV blockchain corresponding to blockchain 2.

In practice, because of the distributed ledger technology of a blockchain, it is meaningless for the cross-blockchain interaction end, the publishing client, and some blockchain nodes in blockchain 2 to tamper with message content. As such, data recorded in a blockchain ledger in blockchain 2 is not affected, ensuring that subscribing client 1 or blockchain node 1 can perform valid verification on the received message.

In an implementation, assume that a corresponding smart contract is created in advance in blockchain 1, the smart contract is triggered once the transaction success message is obtained, and content of a contract operation is transferring a specified amount of RMB from account B1 to account A1. In this case, after blockchain node 1 obtains the transaction success message from the message queue maintained by subscribing client 1, the smart contract can be automatically called and the corresponding contract operation is initiated to automatically transfer a specified amount of RMB from account B1 to account A1. As such, the transfer operation between user A and user B can be completed reliably without a delay (which is a delay caused by a manual operation and does not include a time for transferring and processing data).

Figure 9:
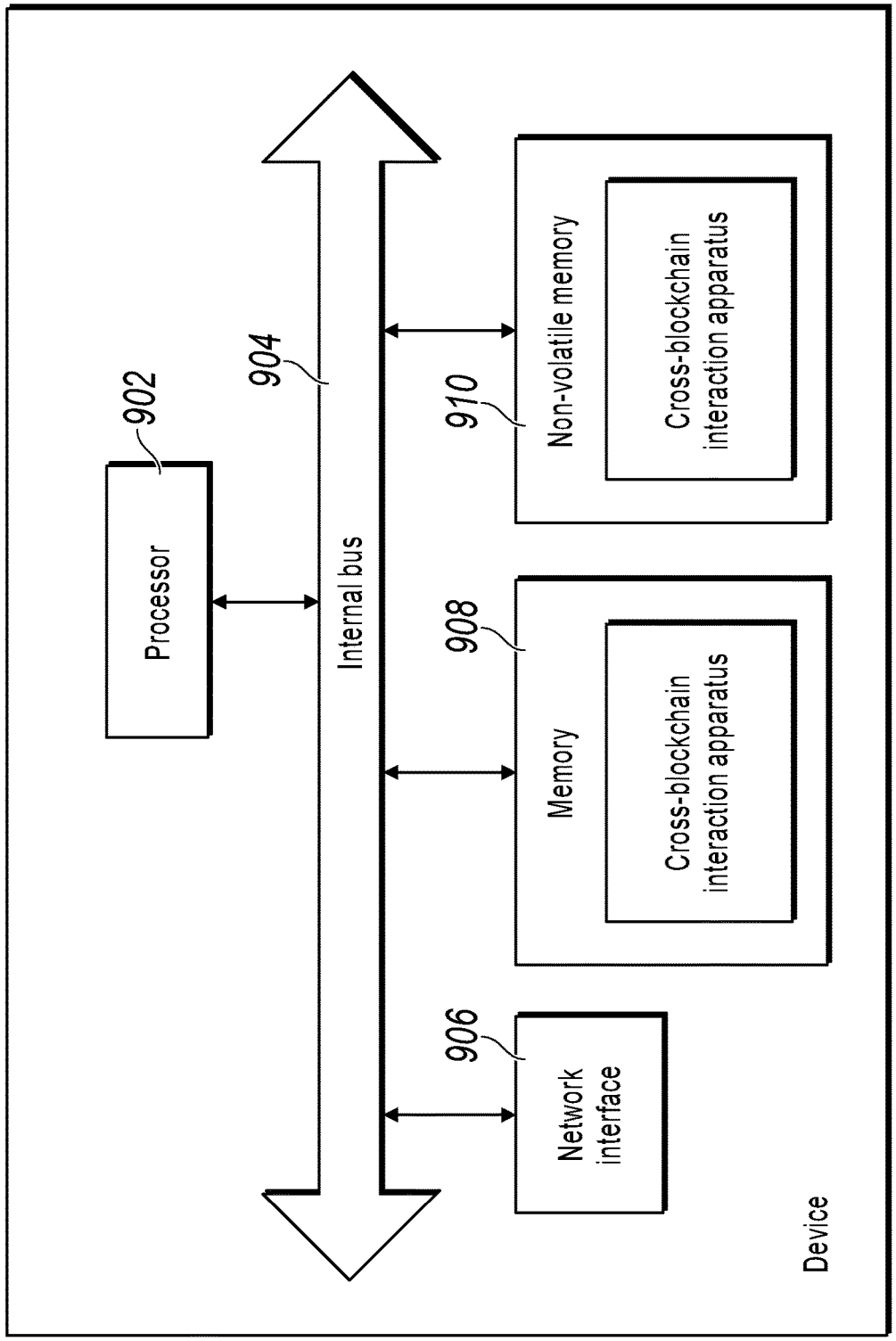
FIG. 9 is a structural diagram illustrating a device, according to an example implementation.

FIG. 9 is a structural diagram illustrating a device, according to an example implementation. Referring to FIG. 9, in terms of hardware, the device includes a processor 902, an internal bus 904, a network interface 906, a memory 908, and a non-volatile memory 910, and certainly can further include other hardware needed by a service. The processor 902 reads a corresponding computer program from the non-volatile memory 910 into the memory 908, and then the corresponding computer program runs to form a logical cross-blockchain interaction apparatus. Certainly, in addition to the software implementation, one or more implementations of the present application include other implementations, for example, a logic device or a combination of hardware and software. In other words, an execution body of the following processing procedure is not limited to each logical unit, and can be hardware or a logic device.

Figure 10:
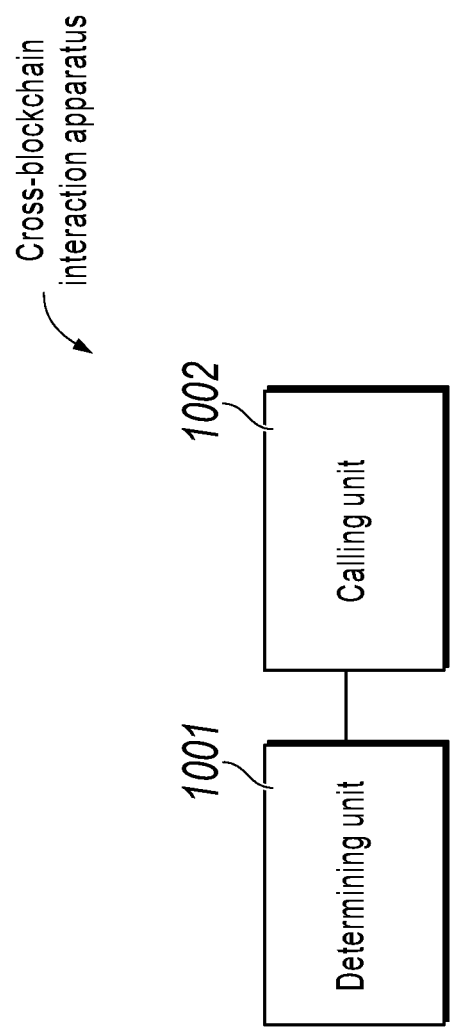
FIG. 10 is a block diagram illustrating a cross-blockchain interaction apparatus, according to an example implementation.

In an implementation, referring to FIG. 10, in the software implementation, the cross-blockchain interaction apparatus can include the following: a determining unit 1001, configured to determine, by the blockchain nodes of the first blockchain, a message generated by a second smart contract in a second blockchain by using a cross-blockchain interaction end between a first blockchain and the second blockchain; and a calling unit 1002, configured to call, by the blockchain node, a first smart contract in the first blockchain to trigger a corresponding contract operation when the message generated by the second smart contract satisfies a subscription condition of the blockchain node.

Optionally, the determining unit 1001 is configured to initiate, by the blockchain node, a subscription request to the cross-blockchain interaction end, where the subscription request is used to indicate the subscription condition to the cross-blockchain interaction end, so that the cross-blockchain interaction end obtains a message that satisfies the subscription condition and is generated by the second smart contract, and adds the message to a message queue maintained by a subscribing client corresponding to the blockchain node; and determine that the second smart contract has generated a message that satisfies the subscription condition when the message queue includes a message that satisfies the subscription condition.

Figure 11:
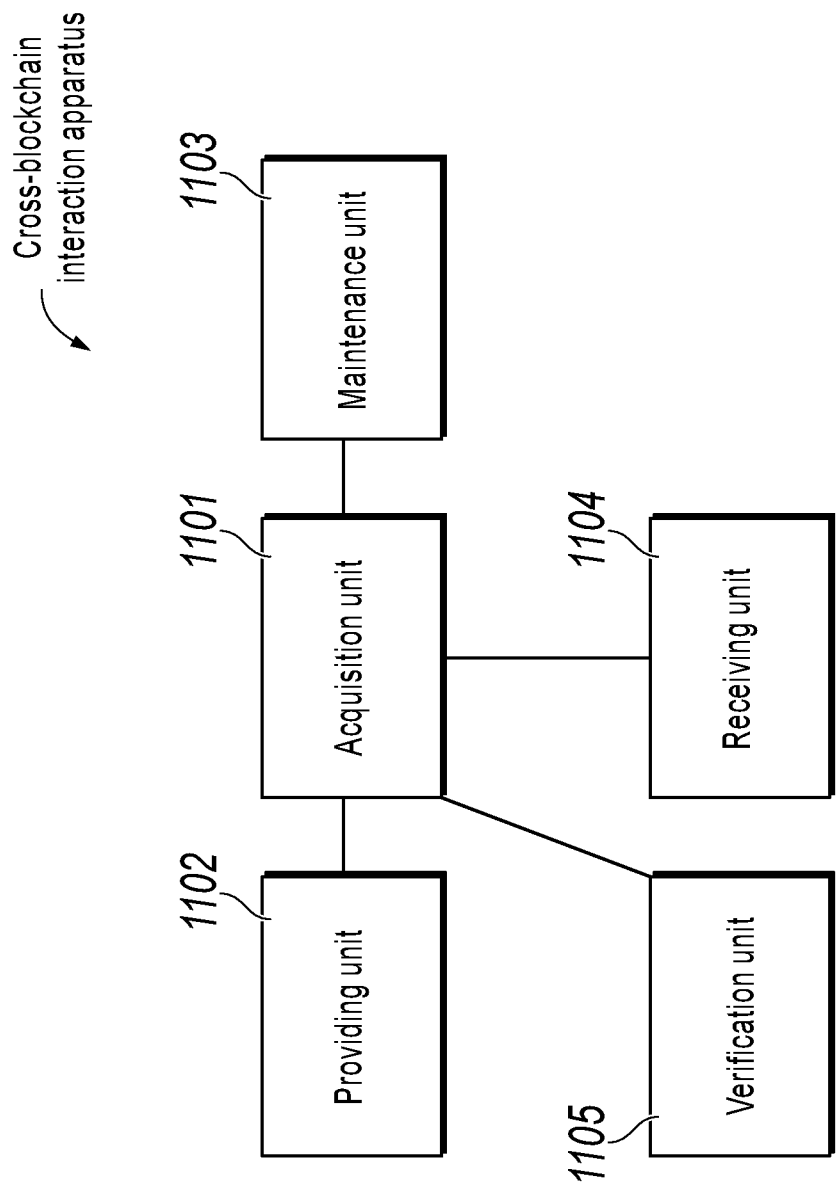
FIG. 11 is a block diagram illustrating another cross-blockchain interaction apparatus, according to an example implementation.

In another implementation, referring to FIG. 11, in the software implementation, the cross-blockchain interaction apparatus can include the following: an acquisition unit 1101, configured to obtain, by the subscribing client, a message generated by a second smart contract in a second blockchain, where the message is obtained by a cross-blockchain interaction end between a first blockchain and the second blockchain from the second blockchain, and the message satisfies a subscription condition provided by a blockchain node in the first blockchain to the cross-blockchain interaction end; and a providing unit 1102, configured to provide, by the subscribing client, the message to the blockchain node, to trigger the blockchain node to call a first smart contract in the first blockchain.

Optionally, the apparatus further includes a maintenance unit 1103, configured to maintain, by the subscribing client, a message queue corresponding to the blockchain node, where the message queue includes a message that the blockchain node subscribes.

The acquisition unit 1101 is configured to provide, by the subscribing client, a queue status of the message queue to the cross-blockchain interaction end, so that the cross-blockchain interaction end obtains a message that satisfies the subscription condition and is generated by the second smart contract in the second blockchain when determining that the message queue does not include a message that satisfies the subscription condition based on the queue status.

Optionally, the apparatus further includes the following: a receiving unit 1104, configured to receive, by the subscribing client, a status query request initiated by the cross-blockchain interaction end, so as to return the queue status to the cross-blockchain interaction end in response to the status query request.

Optionally, the providing unit 1102 is configured to add, by the subscribing client, the message to the message queue; and trigger, by the subscribing client, an arrival event of the message in the first blockchain, so as to trigger the blockchain node to consume the message queue.

Optionally, the apparatus further includes the following: a verification unit 1105, configured to perform, by the subscribing client, verification on the message provided by the cross-blockchain interaction end by using a pre-anchored verification root, so as to provide the message to the blockchain node when it is determined that the message provided by the cross-blockchain interaction end is from the second blockchain.

Optionally, the verification unit 1105 is configured to determine, by the subscribing client, whether the message includes a signature of an oracle client; and determine, by the subscribing client, that the oracle client has verified that the message actually exists in the second blockchain after the signature is verified by the subscribing client; or actively verify whether the message actually exists in the second blockchain.

Figure 12:
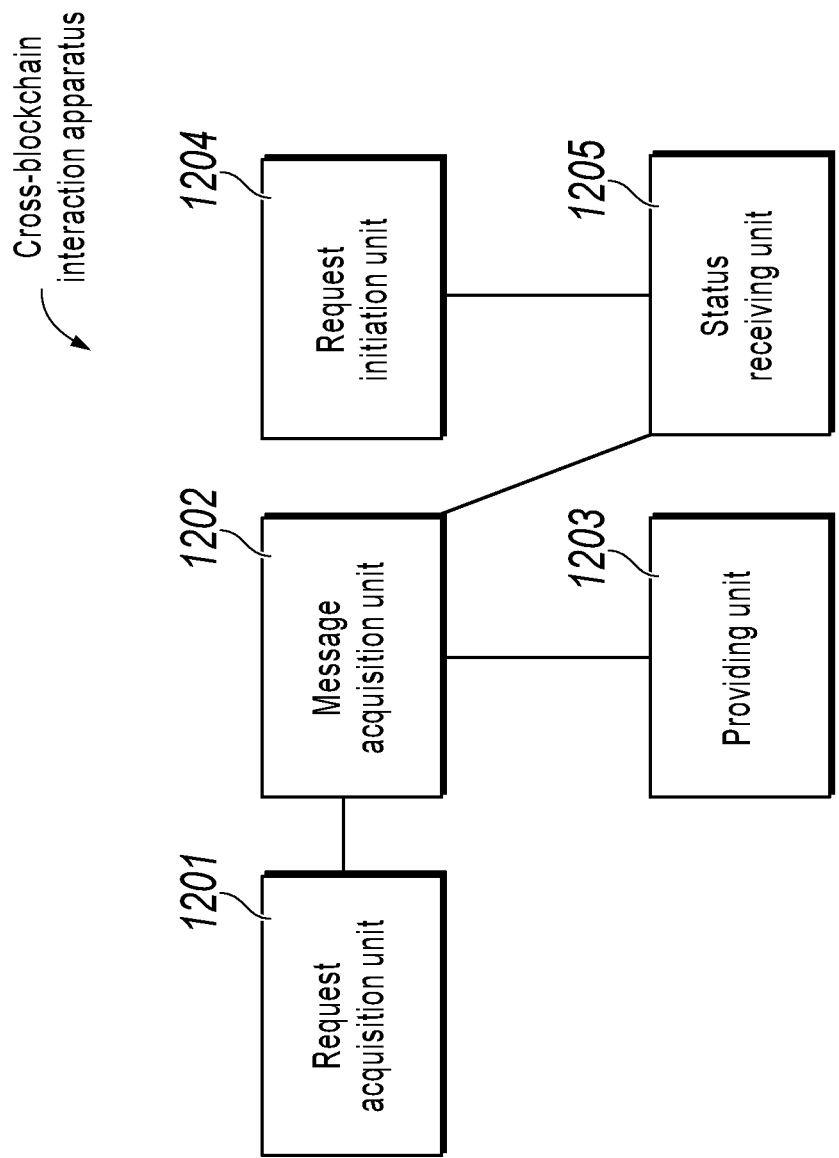
FIG. 12 is a block diagram illustrating still another cross-blockchain interaction apparatus, according to an example implementation.

In still another implementation, referring to FIG. 12, in the software implementation, the cross-blockchain interaction apparatus can include the following: a request acquisition unit 1201, configured to obtain, by the cross-blockchain interaction end, a subscription request initiated by a blockchain node in a first blockchain, where the subscription request includes a subscription condition; a message acquisition unit 1202, configured to obtain, by the cross-blockchain interaction end, a message that satisfies the subscription condition and is generated by a second smart contract in a second blockchain; and a providing unit 1203, configured to provide, by the cross-blockchain interaction end, the message to the blockchain node, so that the blockchain node calls a first smart contract in the first blockchain based on the message.

Optionally, the apparatus further includes the following: a request initiation unit 1204, configured to initiate, by the cross-blockchain interaction end, a status query request to a subscribing client corresponding to the blockchain node, where the subscribing client maintains a message queue corresponding to the blockchain node, and the message queue includes a message that the blockchain node subscribes; and a status receiving unit 1205, configured to receive, by the cross-blockchain interaction end, a queue status of the message queue that is returned by the subscribing client, so as to obtain a message that satisfies the subscription condition and is generated by the second smart contract in the second blockchain when it is determined that the message queue does not include a message that satisfies the subscription condition based on the queue status.

Optionally, the message acquisition unit 1202 is configured to connect, by the cross-blockchain interaction end, to predetermined storage space in the second blockchain through bridging by using a publishing client, where the predetermined storage space is used to store a message generated by the second smart contract; query, by the cross-blockchain interaction end, whether the predetermined storage space includes a message that satisfies the subscription condition by using a query interface provided by the publishing client; and initiate, by the cross-blockchain interaction end, a message acquisition request to the publishing client, so that the publishing client obtains a message that satisfies the subscription condition from the predetermined storage space and returns the message to the cross-blockchain interaction end.

Figure 13:
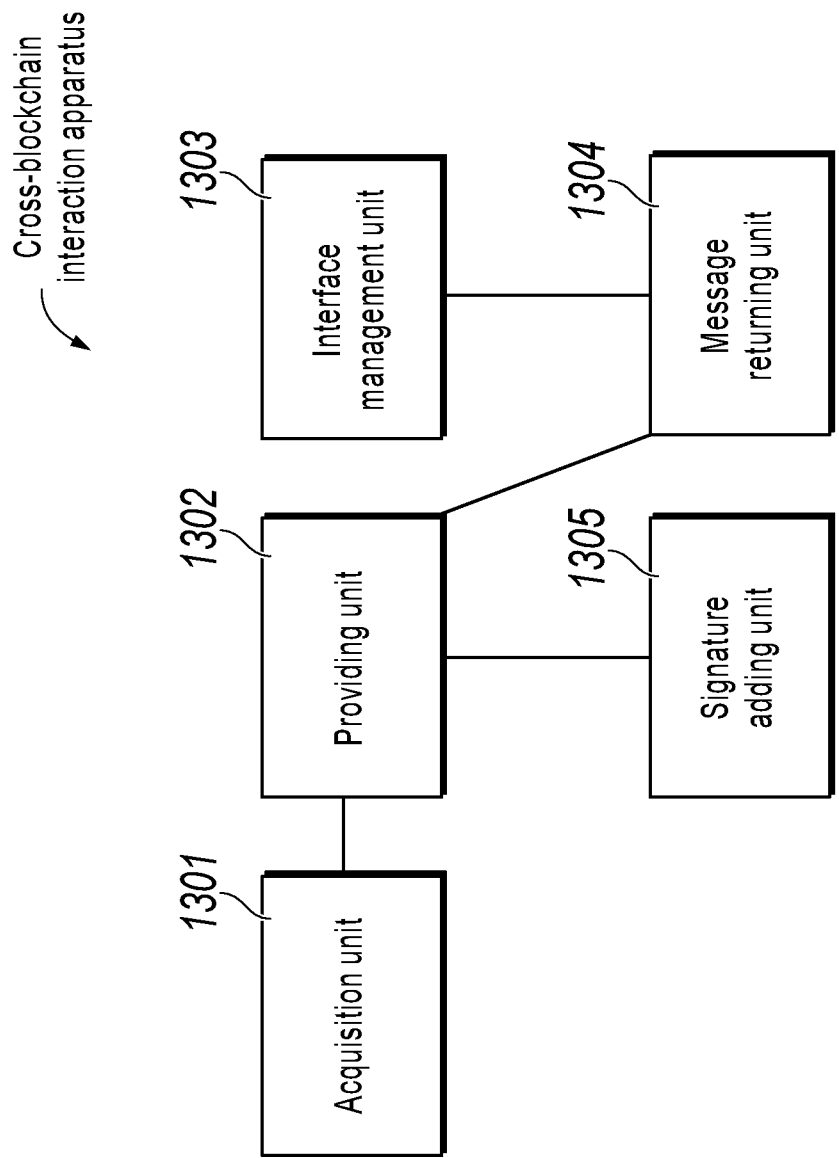
FIG. 13 is a block diagram illustrating yet another cross-blockchain interaction apparatus, according to an example implementation.

In yet another implementation, referring to FIG. 13, in the software implementation, the cross-blockchain interaction apparatus can include the following: an acquisition unit 1301, configured to obtain, by the publishing client, a message generated by a second smart contract in a second blockchain; and a providing unit 1302, configured to provide, by the publishing client, the message to a blockchain node in a first blockchain by using a cross-blockchain interaction end between the first blockchain and the second blockchain, so as to trigger the blockchain node to call a first smart contract in the first blockchain.

Optionally, the providing unit 1302 is configured to receive, by the publishing client, a message acquisition request initiated by the cross-blockchain interaction end, where the message acquisition request matches a subscription condition provided by the blockchain node to the cross-blockchain interaction end; and send, by the publishing client, a message that matches the message acquisition request and is generated by the second smart contract to the cross-blockchain interaction end, so that the cross-blockchain interaction end provides the message to the blockchain node.

Optionally, the publishing client is connected to predetermined storage space in the second blockchain through bridging, the predetermined storage space is used to store a message generated by the second smart contract, and the acquisition unit 1301 is configured to obtain, by the publishing client, the message generated by the second smart contract from the predetermined storage space.

Optionally, a query interface for the predetermined storage space is configured for the publishing client, and the apparatus further includes the following: an interface management unit 1303, configured to open, by the publishing client, the query interface to the cross-blockchain interaction end, so that the cross-blockchain interaction end performs a query in the predetermined storage space by using the query interface; and a message returning unit 1304, configured to obtain, by the publishing client, a message identified by the cross-blockchain interaction end based on a message acquisition request initiated by the cross-blockchain interaction end, and return the message to the cross-blockchain interaction end, where the message identified by the cross-blockchain interaction end matches a subscription condition provided by the blockchain node to the cross-blockchain interaction end.

Optionally, the predetermined storage space includes at least one of the following: a third smart contract in the second blockchain and a predetermined blockchain data structure in the second blockchain.

Optionally, the apparatus further includes a signature adding unit 1305, configured to add, by the publishing client, a signature to the verified message based on a result of verification performed on the obtained message.

The providing unit 1302 is configured to send, by the publishing client, the message to a subscribing client corresponding to the blockchain node by using the cross-blockchain interaction end, so that the subscribing client adds the message to a message queue corresponding to the blockchain node after the signature is verified by the subscribing client, where the blockchain node calls the first smart contract when determining that the message queue includes a message that satisfies the subscription condition.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet, a wearable device, or any combination of these devices.

In a typical configuration, the computer includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. The computer storage medium includes but is not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, a quantum memory, a graphene-based storage medium, another magnetic storage device, or any other non-transmission medium. The computer storage medium can be used to store information that can be accessed by a computing device. Based on the definition in the present application, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

Specific implementations of the present application are described above. Other implementations fall within the scope of the appended claims. In some situations, the actions or steps described in the claims can be performed in an order different from the order in the implementation and the desired results can still be achieved. In addition, the process described in the accompanying drawings does not necessarily require a particular execution order to achieve the desired results. In some implementations, multi-tasking and parallel processing can be advantageous.

The terms used in the one or more implementations of the present application are merely for the purpose of describing specific implementations, and are not intended to limit the one or more implementations of the present application. The terms "a" and "the" of singular forms used in the one or more implementations of the present application and the appended claims are also intended to include plural forms, unless otherwise specified in the context clearly. It should be further understood that the term "and/or" used in the present application indicates and includes any or all possible combinations of one or more associated listed items.

It should be understood that although terms "first", "second", "third", etc. can be used in the one or more implementations of the present application to describe various types of information, the information is not limited to the terms. These terms are only used to differentiate between information of a same type. For example, without departing from the scope of the one or more implementations of the present application, first information can also be referred to as second information, and similarly, second information can also be referred to as first information. Depending on the context, for example, the word "if" used here can be explained as "while", "when", or "in response to determining".

The previous descriptions are only example implementations of the one or more implementations of the present application, but are not intended to limit one or more implementations of the present application. Any modification, equivalent replacement, improvement, etc. made without departing from the spirit and principle of the one or more implementations of the present application shall fall within the protection scope of the one or more implementations of the present application.

Figure 14:
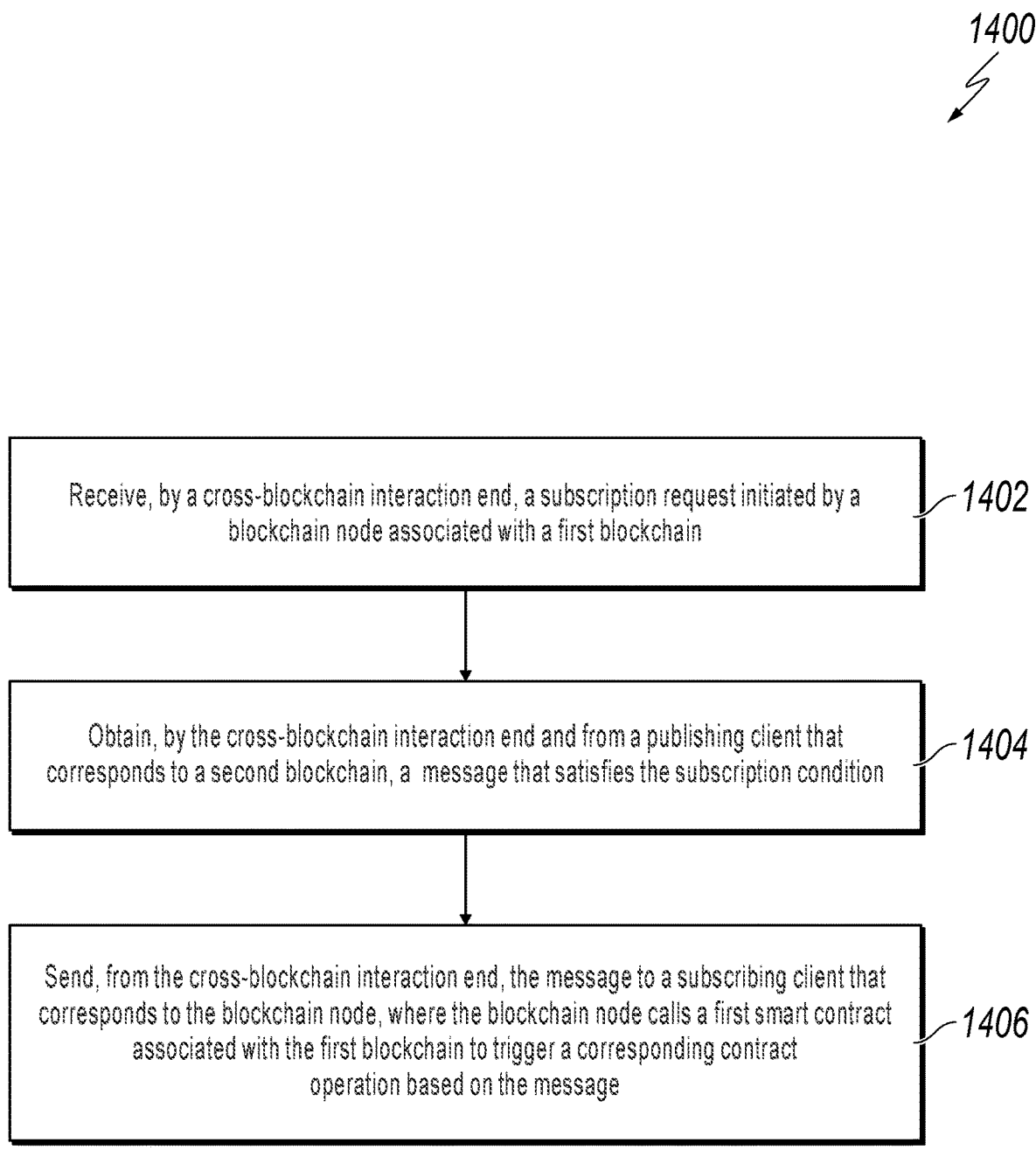
FIG. 14 is a flowchart illustrating an example of a computer-implemented method for improving data transmission in cross-blockchain interactions, according to an implementation of the present disclosure.

FIG. 14 is a flowchart illustrating an example of a computer-implemented method 1400 for improving data transmission in cross-blockchain interactions, according to an implementation of the present disclosure. For clarity of presentation, the description that follows generally describes method 1400 in the context of the other figures in this description. However, it will be understood that method 1400 can be performed, for example, by any system, environment, software, and hardware, or a combination of systems, environments, software, and hardware, as appropriate. In some implementations, various steps of method 1400 can be run in parallel, in combination, in loops, or in any order.

At 1402, a subscription request initiated by a blockchain node associated with a first blockchain is received by a cross-blockchain interaction end, where the subscription request includes a subscription condition. In some implementations, the message is generated by a second smart contract associated with the second blockchain. From 1402, method 1400 proceeds to 1404.

At 1404, a message that satisfies the subscription condition is obtained by the cross-blockchain interaction end and from a publishing client that corresponds to a second blockchain. In some implementations, obtaining the message can include sending, from the cross-blockchain interaction end, a message acquisition request to the publishing client, where the message acquisition request matches the subscription condition. In some implementations, method 1400 can also include receiving, at the cross-blockchain interaction end and from the publishing client, the message, where the message matches the message acquisition request and is generated by a second smart contract associated with the second blockchain.

In some implementations, method 1400 can further include, prior to sending a message acquisition request to the publishing client: querying, by the cross-blockchain interaction end and using a query interface provided by the publishing client, as to whether a predetermined storage space in the second blockchain includes a particular message that satisfies the subscription condition, where the predetermined storage space stores a plurality of messages generated by a second smart contract that corresponds to the second blockchain. If the determination is YES, a message acquisition request is initiated by the cross-blockchain interaction end to the publishing client to obtain the particular message that satisfies the subscription condition from the predetermined storage space. From 1404, method 1400 proceeds to 1406.

At 1406, the message is sent to a subscribing client that corresponds to the blockchain node a from the cross-blockchain interaction end, where the blockchain node calls a first smart contract associated with the first blockchain to trigger a corresponding contract operation based on the message.

In some implementations, method 1400 further includes, prior to obtaining the message: 1) initiating, by the cross-blockchain interaction end, a status query request to the subscribing client, where the subscribing client maintains a message queue that corresponds to the blockchain node; 2) receiving, at the cross-blockchain interaction end, a queue status associated with the message queue from the subscribing client; 3) determining, by the cross-blockchain interaction end, whether the message queue comprises a message that satisfies the subscription condition based on the received queue status; and 4) if it is determined that the message queue does not comprise a message that satisfies the subscription condition, obtaining, by the cross-blockchain interaction end, another message that satisfies the subscription condition from the publishing client that corresponds to the second blockchain.

In some implementations, the message can include a signature added by the publishing client, where the subscribing client updates a message queue that corresponds to the blockchain node by adding the message to that particular message queue after the subscribing client verifies the signature. In some implementations, the blockchain node can call the first smart contract if it is determined that the message queue is updated. After 1406, method 1400 can stop.

Implementations of the present application can solve technical problems in blockchain network data transmission and data storage. In a conventional implementation of a database, when receiving written data, the database saves a data log, and then writes the data to the database. If data loss in the database occurs, the lost data can be recovered by re-executing the written data log. Blockchain data is written into blockchain in a similar way. Each block records a data log passed by block verification, and stores a data state change after the data log is executed. However, under the conventional implementation, data cannot be transferred across different blockchains. As such, transactions that include multiple steps cannot be implemented through cross-blockchain interactions using existing technologies. What is needed is a technique to bypass these problems in the conventional implementations, and to provide a more efficient and unified method for cross-blockchain interactions.

Implementation of the present application provide methods and apparatuses for improving data transmission in cross-blockchain interactions. The solution of these implementations includes an asynchronous cross-chain smart contract call. The smart contract on the blockchain can send an asynchronous message to the smart contract on another chain, ensuring that the message can arrive through the certifiable publish-subscribe framework. According to these implementations, the blockchain node in the first blockchain can provide the subscription condition to the cross-blockchain interaction end, where the cross-blockchain interaction end obtains the asynchronous message. After obtaining the asynchronous message by using the publishing client, the cross-blockchain interaction end can send the asynchronous message to the subscribing client, where the subscribing client adds the asynchronous message to the message queue. The subscribing client can trigger an arrival event of the message in the first blockchain, where the blockchain node in the first blockchain can be triggered to call a first smart contract when determining that the message queue includes the asynchronous message.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising: receiving, by a cross-blockchain interaction end, a subscription request initiated by a blockchain node associated with a first blockchain, wherein the subscription request comprises a subscription condition; obtaining, by the cross-blockchain interaction end and from a publishing client that corresponds to a second blockchain, a message that satisfies the subscription condition; and sending, from the cross-blockchain interaction end, the message to a subscribing client that corresponds to the blockchain node, where the blockchain node calls a first smart contract associated with the first blockchain to trigger a corresponding contract operation based on the message, prior to obtaining the message: initiating, by the cross-blockchain interaction end, a status query request to the subscribing client, wherein the subscribing client maintains a message queue that corresponds to the blockchain node; receiving, at the cross-blockchain interaction end, a queue status associated with the message queue from the subscribing client; determining, by the cross-blockchain interaction end, whether the message queue comprises a message that satisfies the subscription condition based on the received queue status; and if it is determined that the message queue does not comprise a message that satisfies the subscription condition, obtaining, by the cross-blockchain interaction end, another message that satisfies the subscription condition from the publishing client that corresponds to the second blockchain.

2. The computer-implemented method of claim 1, wherein the message is generated by a second smart contract associated with the second blockchain.

3. The computer-implemented method of claim 1, wherein obtaining the message comprises: sending, from the cross-blockchain interaction end, a message acquisition request to the publishing client, wherein the message acquisition request matches the subscription condition; and receiving, at the cross-blockchain interaction end and from the publishing client, the message, wherein the message matches the message acquisition request and is generated by a second smart contract associated with the second blockchain.

4. The computer-implemented method of claim 3, further comprising: prior to sending a message acquisition request to the publishing client: querying, by the cross-blockchain interaction end and using a query interface provided by the publishing client, as to whether a predetermined storage space in the second blockchain comprises a particular message that satisfies the subscription condition, wherein the predetermined storage space stores a plurality of messages generated by a second smart contract that corresponds to the second blockchain; and if the determination is YES, initiating, by the cross-blockchain interaction end, a message acquisition request to the publishing client to obtain the particular message that satisfies the subscription condition from the predetermined storage space.

5. The computer-implemented method of claim 1, wherein the message includes a signature added by the publishing client, and wherein the subscribing client updates a message queue that corresponds to the blockchain node by adding the message to that particular message queue after the subscribing client verifies the signature.

6. The computer-implemented method of claim 5, wherein the blockchain node calls the first smart contract if it is determined that the message queue is updated.

7. A non-transitory, computer-readable medium storing one or more instructions executable by a computer system to perform operations comprising: receiving, by a cross-blockchain interaction end, a subscription request initiated by a blockchain node associated with a first blockchain, wherein the subscription request comprises a subscription condition; obtaining, by the cross-blockchain interaction end and from a publishing client that corresponds to a second blockchain, a message that satisfies the subscription condition; and sending, from the cross-blockchain interaction end, the message to a subscribing client that corresponds to the blockchain node, where the blockchain node calls a first smart contract associated with the first blockchain to trigger a corresponding contract operation based on the message, prior to obtaining the message: initiating, by the cross-blockchain interaction end, a status query request to the subscribing client, wherein the subscribing client maintains a message queue that corresponds to the blockchain node;

receiving, at the cross-blockchain interaction end, a queue status associated with the message queue from the subscribing client; determining, by the cross-blockchain interaction end, whether the message queue comprises a message that satisfies the subscription condition based on the received queue status; and if it is determined that the message queue does not comprise a message that satisfies the subscription condition, obtaining, by the cross-blockchain interaction end, another message that satisfies the subscription condition from the publishing client that corresponds to the second blockchain.

8. The non-transitory, computer-readable medium of claim 7, wherein the message is generated by a second smart contract associated with the second blockchain.

9. The non-transitory, computer-readable medium of claim 7, wherein obtaining the message comprises: sending, from the cross-blockchain interaction end, a message acquisition request to the publishing client, wherein the message acquisition request matches the subscription condition; and receiving, at the cross-blockchain interaction end and from the publishing client, the message, wherein the message matches the message acquisition request and is generated by a second smart contract associated with the second blockchain.

10. The non-transitory, computer-readable medium of claim 9, further comprising: prior to sending a message acquisition request to the publishing client: querying, by the cross-blockchain interaction end and using a query interface provided by the publishing client, as to whether a predetermined storage space in the second blockchain comprises a particular message that satisfies the subscription condition, wherein the predetermined storage space stores a plurality of messages generated by a second smart contract that corresponds to the second blockchain; and if the determination is YES, initiating, by the cross-blockchain interaction end, a message acquisition request to the publishing client to obtain the particular message that satisfies the subscription condition from the predetermined storage space.

11. The non-transitory, computer-readable medium of claim 7, wherein the message includes a signature added by the publishing client, and wherein the subscribing client updates a message queue that corresponds to the blockchain node by adding the message to that particular message queue after the subscribing client verifies the signature.

12. The non-transitory, computer-readable medium of claim 11, wherein the blockchain node calls the first smart contract if it is determined that the message queue is updated.

13. A computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, by a cross-blockchain interaction end, a subscription request initiated by a blockchain node associated with a first blockchain, wherein the subscription request comprises a subscription condition; obtaining, by the cross-blockchain interaction end and from a publishing client that corresponds to a second blockchain, a message that satisfies the subscription condition; and sending, from the cross-blockchain interaction end, the message to a subscribing client that corresponds to the blockchain node, where the blockchain node calls a first smart contract associated with the first blockchain to trigger a corresponding contract operation based on the message, prior to obtaining the message: initiating, by the cross-blockchain interaction end, a status query request to the subscribing client, wherein the subscribing client maintains a message queue that corresponds to the blockchain node; receiving, at the cross-blockchain interaction end, a queue status associated with the message queue from the subscribing client; determining, by the cross-blockchain interaction end, whether the message queue comprises a message that satisfies the subscription condition based on the received queue status; and if it is determined that the message queue does not comprise a message that satisfies the subscription condition, obtaining, by the cross-blockchain interaction end, another message that satisfies the subscription condition from the publishing client that corresponds to the second blockchain.

14. The computer-implemented system of claim 13, wherein the message is generated by a second smart contract associated with the second blockchain.

15. The computer-implemented system of claim 13, wherein obtaining the message comprises: sending, from the cross-blockchain interaction end, a message acquisition request to the publishing client, wherein the message acquisition request matches the subscription condition; and receiving, at the cross-blockchain interaction end and from the publishing client, the message, wherein the message matches the message acquisition request and is generated by a second smart contract associated with the second blockchain.

16. The computer-implemented system of claim 15, further comprising: prior to sending a message acquisition request to the publishing client: querying, by the cross-blockchain interaction end and using a query interface provided by the publishing client, as to whether a predetermined storage space in the second blockchain comprises a particular message that satisfies the subscription condition, wherein the predetermined storage space stores a plurality of messages generated by a second smart contract that corresponds to the second blockchain; and if the determination is YES, initiating, by the cross-blockchain interaction end, a message acquisition request to the publishing client to obtain the particular message that satisfies the subscription condition from the predetermined storage space.

17. The computer-implemented system of claim 13, wherein the message includes a signature added by the publishing client, and wherein the subscribing client updates a message queue that corresponds to the blockchain node by adding the message to that particular message queue after the subscribing client verifies the signature.

* * * * *